(12) United States Patent
Chen et al.

(10) Patent No.: US 7,495,608 B1
(45) Date of Patent: Feb. 24, 2009

(54) POSITION DETERMINATION USING ALMANAC FOR VIRTUAL BASE STATIONS

(75) Inventors: Ben-Ren Chen, Northboro, MA (US); Jingyi Zhou, South River, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 109 days.

(21) Appl. No.: 11/453,870

(22) Filed: Jun. 16, 2006

(51) Int. Cl.
*G01S 1/00* (2006.01)

(52) U.S. Cl. .................................. 342/357.09

(58) Field of Classification Search .................
342/357.01–357.17, 456.3, 455
See application file for complete search history.

(56) References Cited

U.S. PATENT DOCUMENTS

| | | | |
|---|---|---|---|
| 5,477,458 A * | 12/1995 | Loomis ....................... | 701/215 |
| 6,861,980 B1 | 3/2005 | Rowitch et al. | |
| 7,127,257 B2 * | 10/2006 | Riley et al. ............. | 455/456.1 |
| 2003/0125042 A1 | 7/2003 | Olrik et al. | |
| 2003/0125045 A1 * | 7/2003 | Riley et al. ................. | 455/456 |
| 2004/0203880 A1 | 10/2004 | Riley | |
| 2006/0036365 A1 | 2/2006 | Chiayee et al. | |

* cited by examiner

*Primary Examiner*—Thomas H Tarcza
*Assistant Examiner*—Nga X Nguyen
(74) *Attorney, Agent, or Firm*—McDermott Will & Emery LLP

(57) ABSTRACT

Mobile station position determination through a wireless communication network, such as a preliminary fix for use in satellite acquisition assistance, utilizes wireless network almanac data defined in a "virtual" manner, for example, with regard to "virtual base stations." A virtual base station (VBS) is a logical construct, essentially modeled from a number of actual base stations in a generally known region that use some common identification (e.g. the same SID/NID combination). The VBS has a coverage/service area approximating the aggregate coverage area of the actual base stations. The service provider offering acquisition assistance or a location based service need not know the precise locations of the actual base stations. Instead, the service provider can compile a virtual base station almanac (VBSA) based on the identification information and virtual base station location information, for example, to support the service(s) when the provider's customers roam onto another carrier's network facilities.

14 Claims, 6 Drawing Sheets

Table: VBSA fields

| VBS Name | Format Type | Num Protocols | ID1 | ID2 | AntLat | AntLong | Ant Orientation | Ant Open | MAR | CenterLat | CenterLong |
|---|---|---|---|---|---|---|---|---|---|---|---|
| BAYONNE | 2 | 2 | 22 22 | 15 15 | 40.000000 | -74.000000 | 0 | 360 | 75000 | 40.000000 | -74.000000 |
| SYOSSET | 2 | 2 | 22 22 | 12 12 | 40.820000 | -73.500000 | 0 | 360 | 75000 | 40.820000 | -73.480000 |
| ROCKAWAY | 2 | 2 | 22 22 | 18 18 | 40.900000 | -74.520000 | 0 | 360 | 75000 | 40.910000 | -74.520000 |
| BRADLEY BEACH | 2 | 2 | 22 22 | 14 14 | 40.200000 | -74.090000 | 0 | 360 | 75000 | 40.200000 | -74.090000 |
| SHERMAN AVE | 2 | 2 | 8 8 | 4 4 | 39.970000 | -75.050000 | 0 | 360 | 75000 | 39.970000 | -75.050000 |
| NORTH AIRPORT | 2 | 2 | 8 8 | 2 2 | 39.880000 | -75.230000 | 0 | 360 | 75000 | 39.880000 | -75.230000 |
| OCEAN COUNTY | 2 | 2 | 250 250 | 1 1 | 39.270000 | -74.570000 | 0 | 360 | 75000 | 39.270000 | -74.570000 |

*FIG. 5*

POSITION DETERMINATION USING ALMANAC FOR VIRTUAL BASE STATIONS

TECHNICAL FIELD

The present subject matter relates to techniques and equipment to provide an almanac of base station related data for use in position determination with regard to a mobile station, e.g. when roaming off the network of the subscriber's service provider/carrier, specifically, by providing such almanac data with regard to a "virtual" base station region within which the mobile station is operating at the time of the position determination.

BACKGROUND

Many new communications devices and related services have emerged, to allow people to communicate freely as they roam, without the need for a fixed network connection. In particular, modern digital public wireless telephone networks offer customers a wide range of voice and data communication services combined with a high degree of mobility. In this context, situations arise in which it is desirable to obtain information about the physical or geographic location of a mobile communication terminal and/or its user. For example, some carriers offer services in which the user at the mobile station may request location information and/or information about the surrounding geographic locale, for display on or audio presentation from the mobile station. As another example, some carriers and/or other providers offer location services that allow an authenticated third party to request and obtain the location of a mobile station, for example, so that a parent can obtain information about the location of a child or other relative.

Wireless carriers use various location determination methods today. Many of the current techniques require prior knowledge of locations of wireless network equipment that may be sending and/or receiving transmissions over the air to/from a mobile station seeking a position determination. A knowledge base or database of cell site and/or sector information is sometimes referred to as a base station almanac or "BSA." Some location determination methods (e.g., Advanced Forward Link Trilateration) require accurate and complete Base Station Almanac (BSA) information. A carrier providing a position determination service or other services based on mobile station location will often maintain a highly accurate BSA with regard to the carrier's own base stations, e.g. to support AFLT position determinations for mobile stations that use its facilities.

However, the carrier's customers roam, and at times request position determination or location based services while their mobile station's are receiving communication service through another carrier's facilities, that is to say through one or more base stations that may not be identified in the BSA data. BSA data for facilities or networks that are visited by the carrier's roaming customers may not be so readily available or accurate. Some of the other operators may be 'partners,' with whom the home service provider has some favorable arrangements, but at times, the subscribers will receive service from networks of other carriers with whom the carrier does not have any close ties. The home carrier will have different agreements with the various other parties, and the different agreements will provide different levels of data availability with regard to the other network facilities that may provide service to the home carrier's roaming customers. BSA information changes constantly as operators modify and upgrade their facilities. Also, base station data, such as might be needed in a BSA, includes highly proprietary information. Some carrier's do not have the capability of providing relevant information, and others refuse to share the proprietary BSA information for their base stations, particularly with parties that they consider competitors rather than partners.

The industry is moving toward mobile station position determination based on Global Positioning System (GPS) measurements taken by the subscriber's GPS enabled mobile station. To support such services, a network architecture has been developed that includes a position determining entity (PDE), which communicates with a mobile station (MS) having a global positioning satellite (GPS) receiver to determine the location of the MS. For private user plan applications, such as providing location for the MS user or to an authorized third party, the communications between the PDE and the MS utilize an available data link through the network. Mobile devices roam freely, although they are typically associated or 'homed' on a network of the carrier or service provider with which the user subscribes in their normal home area or region. For the private user type location applications, the PDE typically is an entity operated by the home provider. To optimize performance, the mobile wireless networks typically offer satellite acquisition assistance to the mobile stations; and that assistance also relies on BSA information, as discussed below.

A GPS position determination requires a receiver to take measurements from signals received from a number (typically three or four) of the satellites of the GPS system. The array or constellation of GPS satellites transmit highly accurate, time coded information, which a GPS receiver processes in order to determine its three-dimensional location on the Earth. The constellation of GPS satellites provide coverage over the entire surface of the Earth. However, over any given point on the globe, only a smaller subset of the constellation of GPS satellites will provide receivable transmissions or be 'in view' in the particular area.

To perform location computations requires certain data about the transmitting GPS satellites. Ephemeris data or "ephemeredes" specifies the precise orbit of each satellite and can be used to calculate the current location of each satellite. The satellites transmit the ephemeris data for use by GPS receivers, and a ground control station periodically updates the ephemeris data to maintain accuracy. Almanac data is a subset of ephemeris data. Each GPS satellite broadcasts the almanac data for all the GPS satellites in the GPS constellation. A GPS receiver can capture the almanac data and/or the ephemeris data by locking onto the signal from one satellite. However, the transmission time for the data is relatively long. When a receiver must wait while it captures this data, the time to first position computation (first fix) may be several minutes or more, which is typically unacceptable for mobile station applications.

To address this data issue, the mobile communication industries have developed Acquisition Assistance (AA). With this approach, the PDE or another node of the wireless communication network provides a satellite almanac data to the mobile station. However, to optimize performance, the almanac data is tailored to the area in which the mobile station is operating. Rather than sending the almanac data for the entire GPS constellation of satellites, a subset of almanac data is provided for those satellites currently in view from the expected location of the mobile station.

The PDE or another node of the wireless communication network that provides the Acquisition Assistance (AA) selects the subset of GPS satellite ephemeris data and/or almanac data for a particular mobile station based on a preliminary fix of the mobile station's location. However, in many current deployments, the preliminary fix (pre-fix) uses the data from a BSA database. Essentially, the wireless network uses its resources to allow a pre-fix determination based on network information from the BSA. Then the PDE or another node compiles the appropriate acquisition assistance data and sends it to the requesting mobile station, for use in taking measurements of the appropriate satellite signals. Hence, even the GPS position determination is dependent on the availability and accuracy of serving base station information in the service provider's BSA database. As with other location techniques requiring BSA data, it is a challenge to provide location information for a mobile station roaming outside of a carrier's coverage areas.

The industry introduced a possible solution, Location-Based Service V2 Roaming. This version included roaming capability based on a carrier deploying both a Mobile Position Center (MPC) and a Position Determine Entity (PDE). However, it has been very challenging for operators to comply with this complex roaming solution. Thus, a simpler, more efficient process is needed.

SUMMARY

Improvements are disclosed below, by way of example, for offering or assisting mobile station position determinations that require some level of knowledge of base station locations, by using data regarding identifiable 'virtual' base stations, e.g. for roaming or other situations in which precise knowledge of one or more individual base stations serving a particular mobile station may not be available.

A virtual base station is a logical construct, essentially modeled from a plurality of actual base stations and having a coverage/service area approximating the aggregate coverage area of the actual base stations in the area. The virtual base station is readily identifiable from data accessible to the mobile station, e.g. the system identification (SID) and network identification (NID) information broadcast by the actual base stations within the virtual base station area. A defined group of base stations in one virtual base station area, e.g. those in the area that are operated by a particular carrier, all use the same unique combination of SID and NID; base stations in another such area all use a second unique SID/NID combination (different from that used in the first area), and so on.

Although the service provider offering acquisition assistance or a location based service may not know the precise locations of the actual base stations, that provider can typically identify general location information for the broad area of the virtual base station. The service provider therefore can compile a virtual base station almanac (VBSA) based on the identification information and virtual base station location information, for example, to support the service(s) when the provider's customers roam onto network facilities not adequately described in its existing BSA database. In many cases, the general location information in the VBSA is sufficient, e.g. for use in a satellite acquisition assistance application.

Hence, in one example, a method of determining position of a mobile station operating in a wireless communication network may involve receiving a message from the mobile station, which includes at least one item of information identifying a portion of a mobile wireless communication network through which the mobile station is receiving wireless communication service. Based on the received identifying information, one of the records in a database is accessed, for a region in which the mobile station is receiving wireless communication service. Each of the records in the database provides estimated location information for a region corresponding to combined service areas of two or more base stations that utilize the same respective identifying information, such as the same combination of System Identification (SID) and Network Identification (NID). The estimated location information for the identified service region, obtained from the accessed database record, can be used as an estimate of the position of the mobile station.

Disclosed examples use the position estimate as a preliminary fix, for developing acquisition assistance data, e.g. to assist the mobile station is taking measurements of signals from satellites expected to transmit into the identified service region. In such an example, the use of the estimated location information involves processing satellite position data for a constellation of satellites to obtain acquisition assistance data for a subset of the satellites of the constellation from which transmissions are expected to be receivable in the region in which the mobile station is receiving wireless communication service. The resulting acquisition assistance data can be transmitted to the mobile station, for the station's use in acquisition of a position measurement from one or more satellites of the subset. Typically, the acquisition assistance data comprises a selected subset of almanac or ephemeris data for satellites of the global positioning system (GPS) from which transmissions are expected to be receivable within the region in which the mobile station is obtaining wireless communication service.

Aspects of these position estimation and acquisition assistance technologies may be embodied in programming for causing a server to implement any of the techniques outlined and/or in a position determining entity (PDE) programmed to implement one or another the disclosed techniques.

The specification and drawings also disclose a product, in the form of a computer readable medium and a virtual base station almanac (VBSA) database embodied in the medium. The VBSA database comprises a record for each of a plurality of virtual base station (VBSs). Each VBS record contains location data regarding position of a point within a coverage region of a respective one of the VBSs. Each VBS record is accessible using at least one item of identifying information used in common by base stations of a group providing wireless communications service in the coverage region of the respective one of the VBSs.

In a network example described in detailed below, a carrier maintains a base station almanac (BSA) for data associated with the carrier's network, and the methodology selects between that database and an almanac database for virtual base stations or VBSA, e.g. when the mobile station communicates through a base station not on the carrier's network. The almanac databases provide location information, for use as a preliminary fix on the location of the mobile station. A position determining entity uses the preliminary location fix to parse satellite data, so as to develop a subset thereof that is applicable as acquisition assistance data for the mobile station at an approximate location or region corresponding to the preliminary location fix. For example, the position determining entity might provide ephemeris and/or almanac data for just those satellites from which the mobile station might expect to receive signals at its current location corresponding to the preliminary fix.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a table showing possible VBSA database fields.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As discussed below, a mobile station position determination through a wireless communication network, such as a preliminary fix for use in satellite acquisition assistance, utilizes wireless network almanac data defined in a "virtual" manner. In the example, an almanac database maintains location data with regard to a number of "virtual base stations." To appreciate the position determination and acquisition assistance operations, it may be helpful to discuss those operations in the context of an exemplary wireless communication network.

Figure 1:
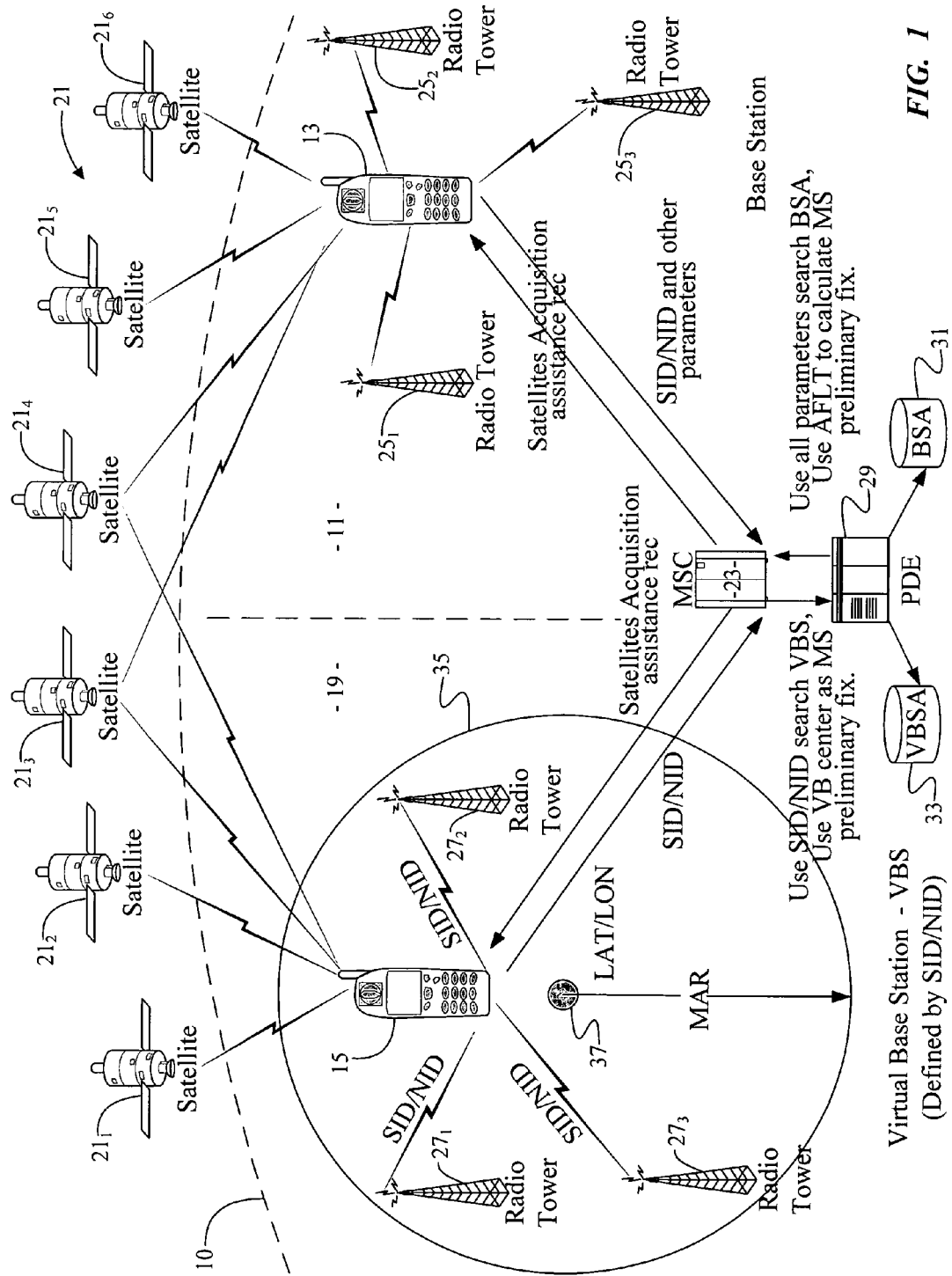
FIG. 1 is a high-level, functional block diagram, of a wireless communication network, which also offers a terminal-location service, using BSA based acquisition assistance for on-net customers and VBSA based acquisition assistance for customers having roamed off-net.

Reference now is made in detail to the examples illustrated in the accompanying drawings and discussed below. FIG. 1 provides a high-level functional illustration of an overall wireless communication network 10 that includes elements operated by a number of different carriers and supports position determinations based on measurements of signals from one or more satellites. Although the present concepts are applicable to other network architectures, for this discussion, it is assumed that the wireless communication network 10 is a public cellular telephone network of the type represented in high level functional block diagram form in FIG. 1.

Each mobile service provider or mobile network carrier typically operates a network, that includes one or more base stations and one or more switching elements, e.g. mobile switching centers (MSCs) or packet-based switching equipment. For discussion purposes, the drawing shows a simplified version of a network 11 operated by one carrier to provide mobile communication services to a number of mobile stations 13 and 15. As discussed more later, the mobile station 13 is one currently receiving service through a portion of the network 11 of the carrier. By contrast, the mobile station 15 represents a mobile station of a subscriber of the carrier that has roamed so as to currently receive its service through some part 19 of the overall network that is not part of the carrier's network 11, typically, a part 19 of the wireless network 10 that is operated by a different carrier.

Although shown as if physically/geographically distinct, the regions or areas served by the networks 11 and 19 may overlap. For example, even though the station may be in a city where it normally receives service from base stations of network 11, from time to time mobile station 15 may obtain service through network 19, e.g. because a building or the like is blocking signals form the base stations on the network 11.

The drawing also depicts a number of the satellites 21 ($21_1$ to $21_6$) of the global positioning system (GPS). Although the satellites are separate from the carrier operated mobile communication networks 11 and 19, in the example, the mobile stations 13, 15 do receive and process signals from the satellites 21 as part of the operations for determining position. As discussed more below, the carrier's network 11 offers Acquisition Assistance (AA) to help in obtaining the final GPS fix of each mobile station's position.

It is assumed that those skilled in the art are familiar with modern wireless communications networks, such as public cellular telephone and data networks, in which it may be desirable to locate a particular user and/or mobile terminal device 13 or 15. However, to provide a context for the later processing examples and to facilitate easy understanding, it may be helpful here to summarize the structure and operation of the exemplary networks 11 and 19.

In the public wireless communication network 10 of FIG. 1, the wireless service communication networks 11 and 19 provide voice telephone communications to subscribers, and one or more of the networks may offer data services. Each such network 11 or 19 enables users of the mobile stations to initiate and receive telephone calls to each other as well as through the public switched telephone network (not shown). Today, a network 11 or 19 also typically enables users of appropriately equipped mobile stations 13, 15 to initiate and receive various data communications, for example via the public data network referred to as the Internet, although for convenience, network elements supporting packet data communications have been omitted.

The mobile stations 13, 15 may take many forms. For example, some mobile stations may be mobile telephone stations, at least some with enhanced display and user input capabilities to support browsing and other data communications applications in addition to voice telephone service. Some of these data services may be location based and require a fix on position of the mobile station. Other mobile stations may comprise portable digital assistants (PDAs) with built-in wireless communication capabilities. As another alternative, a wireless device such as a mobile transceiver having data communication capabilities may be connected to a portable computing device such as a handheld or laptop type computer.

Each network 11 or 19 provides these wireless communication services for mobile stations in accord with a digital protocol or an analog protocol or both. Each network includes mobile station centers (MSCs) or packet-based switching equipment. For purposes of discussion, the drawing shows one of the MSCs 23 of the carrier's network 11. Each MSC connects through trunk circuits to a number of base stations, which the respective MSC controls. The example shows three of the carrier network base stations 251 to 253 (represented by the radio towers thereof in the drawings) controlled by the MSC 23, in the carrier's network 11. Links between the MSC and the base stations are omitted for ease of illustration. An MSC or other element (not shown) in the other carrier's part 19 of the wireless communication network 10 will similarly connect to and control base stations 27₁ to 27₃ and provide signaling and bearer communications with the network 11 via the MSC 23. Trunks are provided between appropriate MSCs where necessary to provide communications between the networks 11 and 19.

The base station or base transceiver system (BTS) at a station 25 or 27, is the part of the radio network that sends and receives RF signals to/from the mobile stations 13, 15 that the base station currently serves. The base station connects to and communicates through the antenna systems on a radio tower. The base station transceiver system at a site contains the transmitters and receivers and is responsible for the control, monitoring, and supervision of calls made to and from each mobile station within its serving area or "cell," over the wireless air link.

For wireless services, mobile stations are provisioned to normally operate in the serving area of one wireless network operated by the user's access service provider or carrier, and this radio system is referred to as the "home" location or system. In the example, the stations 13 and 15 are both homed on a portion of the network 11. Other stations (not shown) will be homed on one or more other networks in the off-net portion 19 of the overall wireless network 10. The regions served by the two networks 11 and 19 may overlap, or the regions may be separated geographically.

There are a number of different techniques for obtaining data that may be processed to determine the location of a mobile station. The cell sites and/or MSC may provide cell and sector data for one or more base stations detecting signals from the mobile station 13 or 15 in question. Signal strength data may also be available. Some networks 11 include equipment to triangulate on a signal from a mobile station 13. Such triangulation requires knowledge of the location and other information about each base station that may be serving a mobile station for which the system will make or assist in a position determination.

In the example, the service provider's portion 11 of the network 10 provides information for Advanced Forward Link Trilateration (AFLT). As discussed more later, AFLT relies at least in part on accurate and comprehensive base station information, typically maintained in a base station almanac (BSA) database 31. The AFLT data could be used for providing a final fix, although for purposes of the discussion of GPS and the acquisition assistance, the triangulation is used to help select a subset of acquisition data to assist the mobile station 13 in its measurements of signals from satellites 21. Hence, a position determination by the network 11 based on AFLT provides a preliminary fix or "pre-fix."

In this example, each mobile station 13 or 15 includes a GPS receiver for use in determining the station's location. GPS or the "Global Positioning System" is a satellite-based navigation system. A constellation of orbiting satellites 21 broadcasts specially coded signals that can be processed in a GPS compatible receiver, enabling the receiver or other processing device to compute position, velocity and time information. To expedite mobile station measurements, however, the network 11 provides the stations acquisition assistance data upon request.

The network 11 includes one or more Position Determining Entities (PDEs) 29, which manages the position or geographic location determination of each mobile station, including providing the acquisition assistance data to the mobile station. The PDE system 29 is essentially a general purpose programmable device with an interface for data communication via the networks 11, 19. The PDE 29 stores or has access to a complete and up to date set of the satellite data for the satellites 21 needed to allow computation of position based on pseudorange measurements from satellite signals. The data may include data for the entire constellation of satellites 21 or be limited somewhat for satellites expected to transmit into some relatively large geographic region over which the operator offers related services, e.g. over the Americas.

To allow the PDE 29 to parse the satellite data down to assistance data needed by mobile stations at particular locations, the PDE 29 computes a pre-fix location for each mobile station 13, 15 when the mobile station requests acquisition assistance data. The pre-fix determination uses base station data regarding base stations of the wireless communication network. Hence, the PDE 29 contains or has access to two databases of network almanac information, a base station almanac (BSA) database 31 and a virtual base station almanac (VBSA) database 33. Of particular note, the exemplary PDE 29 uses data from the VBSA database 33 to support a technique for providing satellite acquisition assistance information, to help when calculating a mobile station (MS) location when the MS 15 is roaming off-net.

Before discussing acquisition assistance, however, it may be helpful to briefly review techniques for determining mobile station position based on the Global Positioning System (GPS). GPS receivers use measurements from several satellites 21 to compute position. GPS receivers normally determine their position by computing time delays between transmission and reception of signals transmitted from satellites and received by the receiver on or near the surface of the earth. The time delays multiplied by the speed of light provide the distances from the receiver to the satellites 21 from which the particular receiver takes its measurements. The measured distances from known satellite positions then enable computation of the position of the receiver.

More specifically, each GPS signal available for commercial use utilizes a direct sequence spreading signal defined by a unique pseudo-random noise (PN) code, which uniquely identifies the particular satellite. GPS receivers determine the time delays between transmission and reception of the signals by comparing time shifts between the received PN code signal sequence and internally generated PN signal sequences. The measured delays are referred to as "pseudoranges." A set of three pseudorange measurements together with knowledge of absolute times of transmission of the GPS signals and satellite positions enables a GPS computation of the receiver's latitude and longitude. If the data includes a pseudorange measurement, knowledge of transmission time and satellite position for a fourth satellite, the position computation can also determine the receiver's altitude.

Hence, knowledge of transmission times and satellite positions is critical to the position computation. Each of the GPS satellites broadcasts a "satellite navigation message." An absolute time signal in the satellite navigation message allows the receiver to determine a time tag for when each satellite transmitted each signal detected by the GPS receiver. Ephemeris data in the satellite navigation message identifies the satellites and their orbits. Almanac data is a subset of ephemeris data. Each GPS satellite broadcasts the almanac data for all the GPS satellites in the GPS constellation.

In a full GPS receiver configuration, the individual receiver locks onto one of the satellite signals and captures the almanac and ephemeris data from the satellite navigation message in the particular satellite signal. However, for mobile station acquisition assistance, the PDE 29 provides parsed satellite information to a mobile station 13 or 15 attempting a GPS position fix. Essentially, the PDE 29 receives or stores the almanac and ephemeris data; and the PDE parses that data down to a subset thereof applicable to the satellites expected to be in view from a mobile station's current location, based on a preliminary fix of the mobile station's position. The selection of the appropriate subset of the satellite data, to assist a particular mobile station in its GPS pseudorange measurements, therefore depends on knowledge of the preliminary position fix of the particular mobile station. The preliminary position fix requires at least some knowledge of the facilities of the wireless communication network 11 or 19 serving the mobile station 13 or 15 at the station's current position.

In operation, the PDE 29 receives a request for acquisition assistance from a mobile station. The PDE 29 offers acquisition assistance both to stations 13 receiving service through the carrier's network 11 and to stations 15 having roamed so as to receive service from another part 19 of the overall wireless communication network 10. Assume for example, that the PDE 29 receives a request for acquisition assistance from a roaming mobile station 15. The request includes at least one item of information, which identifies a portion 19 of a mobile wireless communication network 10 through which the mobile station 15 is receiving communication service. Location data for a preliminary fix is retrieved from a database 33, based on the identifying information. The PDE 29 uses location data from the database 33 to determine the subset of satellite data for use as the acquisition assistance data, for the mobile station 15 at its current position. The PDE 29 transmits the resulting acquisition assistance data to the mobile station 15 for use in acquisition of a position measurement from one or more satellites 21.

In such an acquisition assistance operation, the geographic region 35 may be considered as a virtual base station or "VBS." The VBS region encompasses cell coverage areas served through a number of the base stations in a group defined by common identification information. Although the precise location of the base stations $27_1$ to $27_3$ may not be known, it is possible to generally define the region 35 and, for example, estimate the latitude (LAT) and longitude (LON) at the approximate center 37 of the region. Roughly, the center 37 corresponds to a geographic point of a central base station radio tower, if one base station served a single cell corresponding to the entire geographic region 35.

The illustrated technique uses information available to the mobile station 15 to identify the VBS 35. As noted in the background, some location determination methods (e.g., Advanced Forward Link Tri-lateration) require accurate and complete Base Station Almanac information, but it is often difficult and impractical to compile and maintain BSA data for another carrier's network equipment because the data is being changed constantly and contains highly proprietary information. However, SID and NID information is stable and passed between wireless carriers for voice/data roaming purposes, and the broad geographic region of service of a group of carrier's base stations that use a unique SID/NID combination can generally be determined or estimated from available information. For example, in SID and NID Exchange Records there are Name fields that are always related to geographical location. Although other forms of identification data may be used, in the example, the VBSA database and related processing therefore can identify base station groups and aggregate service area locations based on a combination of SID and NID identifying data.

Hence, in the example, a Virtual Base Station (VBS) 35 is a virtually defined non-sector Cellular Base Station (omni cells) defined by SID/NID combination. The exemplary VBS encompasses real base stations $27_1$ to $27_3$ that use the same SID/NID combination. It has a maximum antenna range (MAR) corresponding approximately to the radius of the combined cell coverages of the real base stations. The VBS 35 has an approximate center location 37 of known latitude (LAT) and longitude (LON), which can be used as the preliminary fix for a mobile station 15 receiving service from one of the base stations $27_1$ to $27_3$ that transmit the particular SID/NID combination used to define the group and then to define the specific one 35 of the virtual base stations.

When the mobile station 15 requests acquisition assistance, the request includes the SID and NID for the serving base station(s) as well as other data. The PDE 29 searches the VBSA database 33 using the SID and NID received from mobile station 15 and accesses the record for the VBS 35. The PDE 29 uses the center 37 of the virtual base station (VBS) 35 as the mobile station's initial position estimate (Pre-fix). Based on the initial mobile station position estimate, the PDE 29 produces ephemeris, almanac or acquisition/sensitivity assistance records from the data regarding the constellation of satellites 21. These assistance records contain satellite almanac, satellite visibility, Doppler and clock correction information. The PDE 29 sends this information for the identified VBS location 37 to the mobile station 15. The mobile station 15 will, in turn, use this information (also known as aiding records) for multiple satellite pseudorange measurements. Depending on the device/network configuration, the mobile station or the PDE can then calculate a final fix using these pseudorange measurements.

Figure 2:
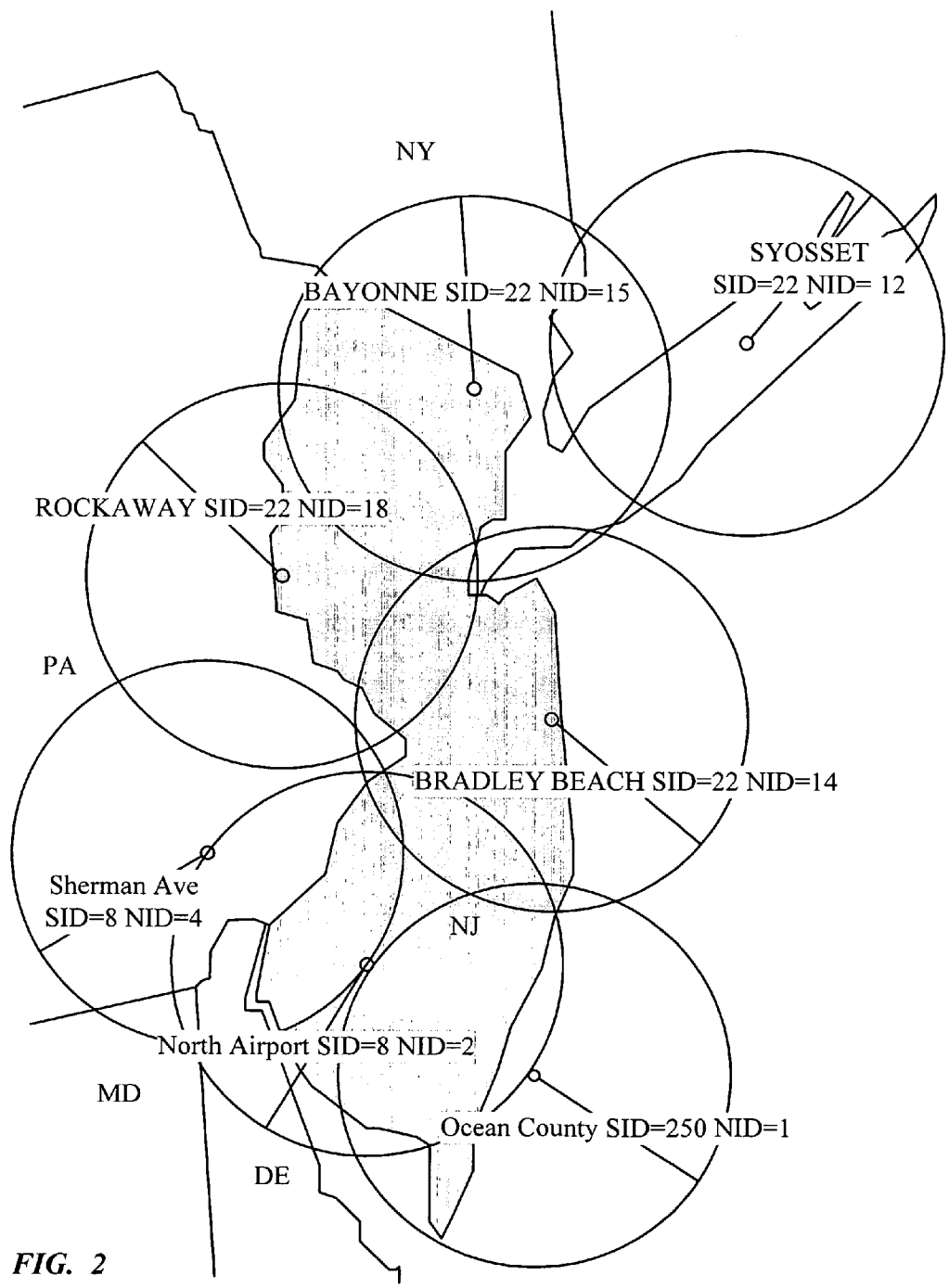
FIG. 2 is a map with an overlay of several VBS regions.

FIG. 2 is a map with an overlay of several VBS regions. Assume for discussion purposes that the carrier operating the portion 19 of the network 10 provides service in the state of New Jersey (NJ) and some of the surrounding states. The network 11 may overlap with the service area of the network 19, or the network 11 may operate in a totally separate geographic region. Adjacent or overlapping cells of the network 11 are omitted, for convenience. However, from time to time, the mobile stations 15 of the service provider will roam so as to receive service from elements of the network portion 19 in New Jersey (NJ) or the surrounding states.

Logically, the VBSA database 33 divides the coverage areas of a particular carrier (roaming carrier) that may provide service to a roaming mobile station 15 into many virtual non-sector base stations (omni cells) as defined by the SID and NID combination being sent by corresponding groups of actual base stations. FIG. 2 illustrates several such virtual cells in and around NJ, by way of example. The virtual base station (VBS) cell having the SID 250 and the NID 1 is designated as the VBS for Ocean County, N.J. A virtual base station cell centered at the North Airport location has the SID 8 and the NID 2, whereas a virtual base station cell centered at Sherman Ave (in Philadelphia) has the SID 8 and the NID 14. The Bradley Beach VBS has the SID 22 and the NID 14, the Rockaway VBS has the SID 22 and the NID 18, the Bayone VBS has the SID 22 and the NID 15, and the Syosset VBS centered out on Long Island N.Y. has the SID 22 and the NID 12.

The center point of the virtual base station should be near the geographical center of the SID/NID coverage area. This VBS method can effectively divide and define a roaming carrier's coverage areas. This virtual mapping implemented in the Virtual Base Station Almanac (VBSA) database 33 can be created by the Home carrier based on the City, State, SID and NID information provided in roaming and/or partner agreements between the various network operating entities. For example, the name fields in SID/NID exchange records often provide sufficient data to determine an approximate area/location for a set of base stations recognizable as a defined group for a VBS by their use of the same unique combination of SID and NID. LAT/LON for the approximate center point can then be computed from general knowledge of the location of the VBS region.

Returning to operations in the system 10 of FIG. 1, the system 10 and the mobile stations 13, 15 typically will implement a two-phase fix (a preliminary fix or 'pre-fix' and a final fix). The processing, however, varies depending on the information available as to the pre-fix. Before the pre-fix, each mobile station transmits SID, NID, base station ID, frequency and pseudorandom noise (PN) of neighbor cells and other parameters to the PDE 29, typically, with or in association with the mobile station's request for acquisition assistance information. This identification information may allow a relatively precise pre-fix determination, for a station 13 served through the network 11; or this information may be used to provide a pre-fix using VBSA information that typically is not quite as precise but is often sufficient to enable a substantial degree of acquisition assistance.

If the mobile station is one 13 operating through the carrier's network 11, the PDE 29 uses information received from the mobile station 13 and the BSA database 31 to identify serving cell/sector, and to calculate a preliminary mobile station location using Advanced Forward Link Tri-lateration (AFLT). The PDE 29 uses the pre-fix mobile station location data to calculate the GPS search window information (satellites in view, Doppler and clock correction). The PDE 29 returns the GPS search window information to the mobile station 13, for multiple satellite pseudorange measurements, e.g. for measurements from satellites $21_3$ to $21_6$ in view over its current location.

When roaming, a mobile station 15 similarly transmits wireless network system parameters (SID, NID, etc.) over the air and through the network elements, to the Position Determination Entity (PDE) 29, e.g. when it requests position information. However, there is no data in the BSA database 31. Hence, the PDE 29 uses the wireless network System Identification (SID) and Network Identification (NID) to derive an initial estimated mobile station position and obtain corresponding acquisition assistance information for a virtual base station (VBS) 35, from the VBSA database 33. The Virtual Base Station Almanac (VBSA) 33 is a table/database that defines each Virtual Base Station 35 for purposes of location based service (LBS) in the wireless communication network 10. The VBSA contains a subset of BSA fields. The VBSA database records are formatted so as to conform to standard requirements for a Location Based Service (LBS) type 2 Base Station Almanac (BSA), e.g. so as to be fully compatible with Qualcomm LBS type 2 BSA.

The processing of the VBS record from the database 33 provides the LAT/LON position data as a pre-fix estimate of the current location of the mobile station 15. The PDE 29 uses the pre-fix mobile station location data from the VBSA database 33 to calculate the GPS search window information (satellites in view, Doppler and clock correction), in a manner similar to the calculation for the mobile station 13. Since the pre-fix is less precise, however, the search window typically will be somewhat larger for the mobile station 15. In many cases, the larger search window will only encompass one or two more of the satellites 21. The PDE 29 returns the resultant search window information to the mobile station 15 for multiple satellite pseudorange measurements, e.g. for measurements from satellites $21_1$ to $21_4$ in view over its current VBSA location.

In either case, the PDE 29 returns the GPS acquisition assistance information, either from the BSA database 31 or from the VBSA database 33. The data allows the mobile station 13 or 15 to perform pseudorange measurements to multiple satellites. Depending on the device/network configuration, the mobile station or the PDE 19 will use these measurements for the GPS final fix position calculation. This final position can then be forwarded to the application requesting the position of the mobile station, either in the mobile station or in some other device.

The assistance technique outlined above provides a method to determine a mobile station's approximate geographical location using a position determination system, when the mobile station 15 is roaming outside the home carrier's coverage area. For some service providers, the virtual base station almanac database 33 may provide acquisition assistance for all mobile stations, e.g. whether operating on the provider's own network or on another carrier's network. However, as shown by the above discussion of the example, the service provider may offer more accurate assistance for customers while operating on-network, via the BSA database 31. In such an arrangement, the VBSA database 33 is used when there is no accurate and complete base station almanac (BSA) information available from the database 31.

Figure 3:
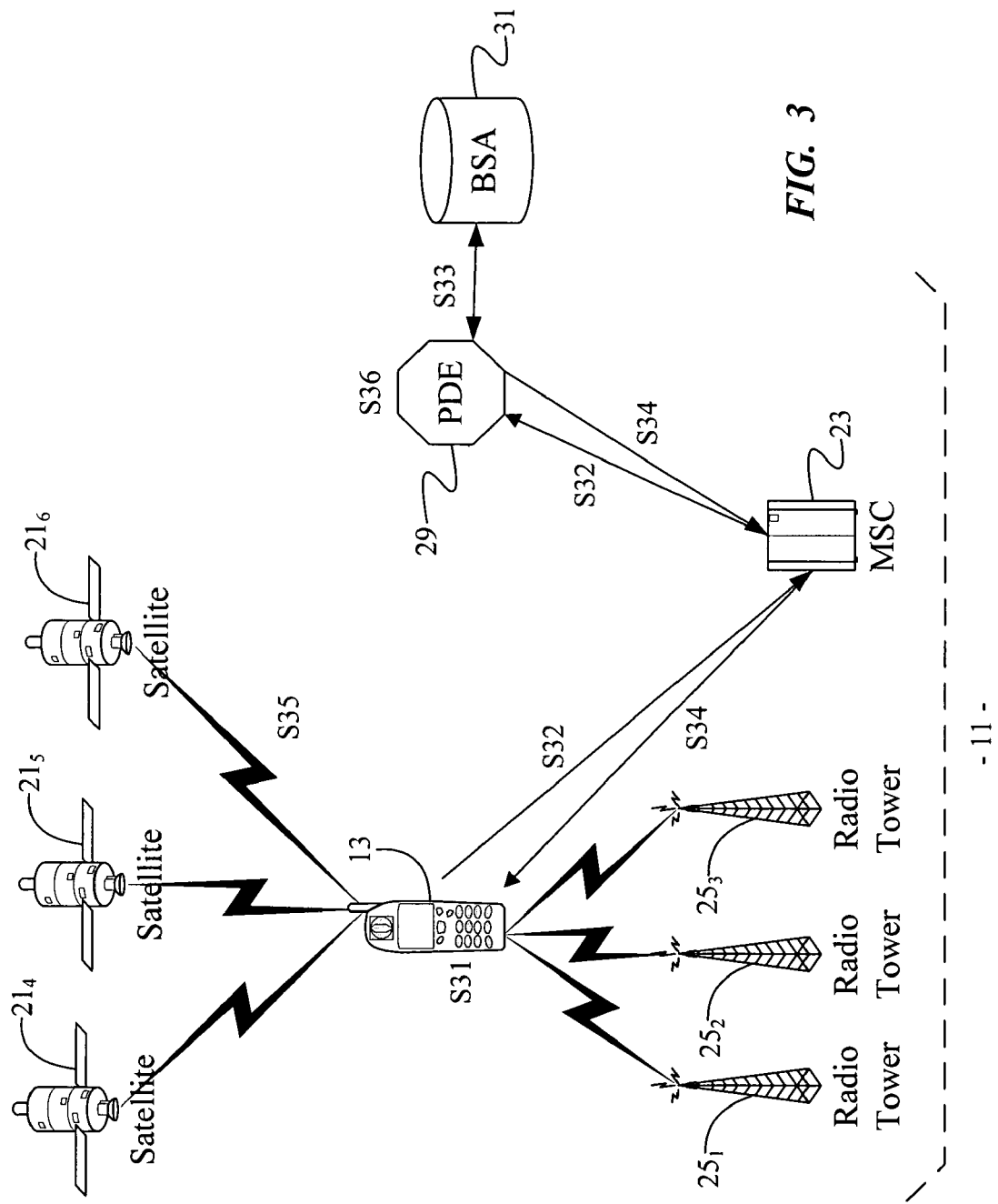
FIG. 3 is a signal flow diagram for a typical mobile station location fix, when BSA data is available, e.g. when the mobile station is on-net.
Figure 4:
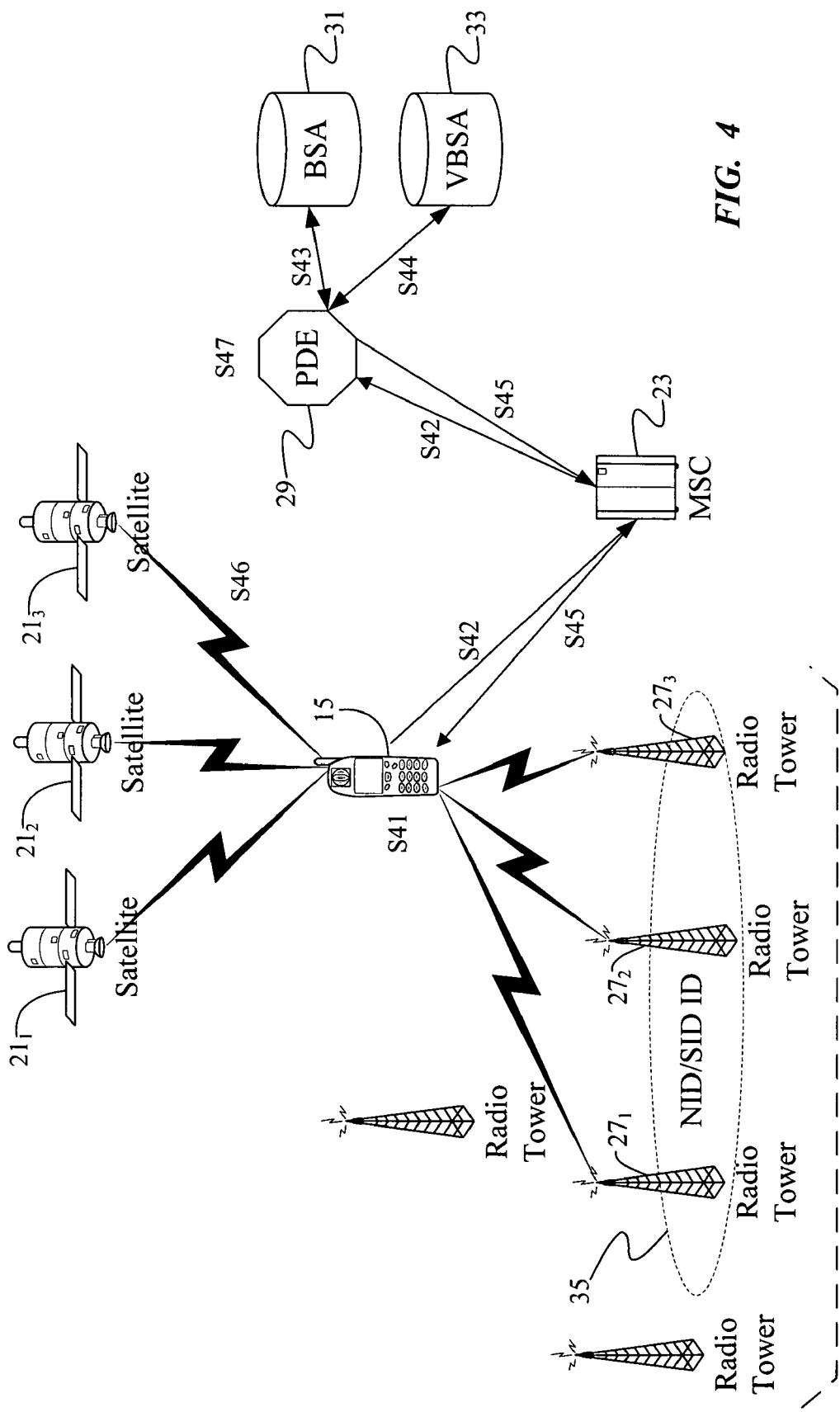
FIG. 4 is a signal flow diagram for a mobile station location fix, when BSA Data is not available, e.g. when the mobile station is roaming off-net.

It may be helpful to consider the process flows for the two examples, on-net (not roaming) and off-net (roaming) in somewhat more detail. FIGS. 3 and 4 are simplified diagrams of the network overlaid with reference numbers for the exchanged signals, useful in showing the order of certain processing steps. In this way, FIG. 3 shows the example of an operation providing acquisition assistance for a position determination for a mobile station 13 operating on the carrier's network 11, whereas FIG. 4 shows the example of an operation providing acquisition assistance for a position determination for a mobile station 15 whose user has roamed so that the station 15 is off-net (receiving service through another carrier's network 19).

Consider first the on-net example of FIG. 3. At step S31, mobile station 13 accesses a Location Based Service which requests the mobile station 13 to determine its location. For example, the user may operate the mobile station 13 to request information about the area in which the user is traveling. In response to the request to determine its location, the mobile station 13 sends position related data to PDE 29, such as NID, SID, PN Offset, in the form of a request message through the MSC 23 to the PDE 29 (step S32). The data transmission to the PDE 29 is an example of a request for acquisition assistance. In response (at step S33), the PDE 29 refers to the BSA database 31 to estimate mobile station location (determine a pre-fix). In the example discussed above, the PDE uses information received from the mobile station 13 and BSA database 31 to identify serving cell/sector, and to calculate a preliminary mobile station location using Advanced Forward Link Tri-lateration (AFLT), although other networks may use different technologies for the on-net pre-fix determination.

Based on the pre-fix information, the PDE 29 computes or retrieves related satellite information for the pre-fix location of the mobile station 13. Essentially, the PDE 29 uses the pre-fix location data for the mobile station 13 to calculate the GPS search window information (satellites in view, Doppler and clock correction) from the time, ephemeris and almanac data regarding the constellation of satellites 21.

The PDE 29 returns the satellite information as GPS Acquisition Assistance (AA) data through the MSC 23 and the network links to the mobile station 13 (step S34). In step S35, the mobile station 13 uses the GPS Acquisition Assistance data to take pseudorange measurements with respect to at least 3 satellites, e.g. for satellites $21_4$ to $21_6$ in view over its current location. If the mobile station 13 has full GPS computational capabilities, it can now determine the final fix for its present location. However, if the particular mobile station 13 cannot perform final fix, pseudorange and satellite data are returned to PDE, which performs the final fix calculation (S36).

Consider next the roaming/off-net example of FIG. 4. At step S41, the roaming mobile station 15 accesses a Location Based Service which requests the mobile station 15 to determine its location. For example, an authorized third party may communicate with a server to request the location of a child or the like who uses the mobile station 15; in which case, the server instructs the station 15 to determine its position. In response to the request to determine its location, the mobile station 15 sends position related data to PDE 29 through the network links and the MSC 23, e.g. as a request for acquisition assistance, at step S42. The position related data may include NID, SID, PN Offset. In this example, the SID and NID correspond to a virtual base station region 35.

In step S43, the PDE 29 refers to the BSA database 31 to determine estimated position (pre-fix) as in the example of FIG. 3. To this point operations are similar to those in the on-net example of FIG. 3. However, for the roaming mobile station 15 in VBS 35, the BSA information does not exist or is incomplete. Hence, the PDE 29 cannot calculate the pre-fix from the identification information and the BSA database 31. Instead, processing flows to step S44.

At S44, the PDE 29 checks the VBSA database 33, using the SID/NID data received from the mobile station 15, to determine approximate mobile station location (Pre-Fix). The combination of the SID and the NID uniquely identifies a VBS 35, and the database provides latitude and longitude for the center of the region for that VBS. The PDE 29 uses that center position data as the pre-fix location data for the mobile station 15 to calculate the GPS search window information (satellites in view, Doppler and clock correction) from the time, ephemeris and almanac data regarding the constellation of satellites 21 (step S44). The resulting data set may be a bit larger, e.g. encompassing data for one or more additional satellites, when compared to the acquisition assistance data sent to the on-net mobile station 13, because the pre-fix covers a larger less precise area 35. However, the acquisition assistance data is still substantially smaller in volume that the data that the receiver would need to collect to capture the entire set of data via reception of a GPS satellite signal.

In step S45, the PDE 29 returns the GPS Acquisition Assistance (AA) data through the MSC 23 and the network links to the mobile station 15. In step 46, the mobile station 14 uses the GPS Acquisition Assistance data to take pseudorange measurements with respect to at least 3 satellites, e.g. for satellites $21_1$ to $21_3$ in view over its current location. If the mobile station 15 has full GPS computational capabilities, it can now determine the final fix for its present location. However, if the mobile station 15 cannot perform final fix, pseudorange and satellite data are returned to the PDE, which performs the final fix calculation (S47).

FIG. 5 is a table showing possible database fields for a number of VBSs, as they might appear in a VBSA database 33. The illustrated fields contain the data used for pre-fix computation. In the examples outlined above, the PDE 29 computed or prepared subsets of satellite data for assistance records in response to pre-fix location from such fields of the database. However, the database 33 could provide additional fields for satellite acquisition assistance data, if the acquisition assistance data is prepared in advance and maintained in the database, although such additional fields are omitted from the table, for convenience.

In general, the pre-fix fields are similar to those of a LBS type 2 BSA database. For example, the sector name corresponds to the name assigned to each respective VBSA. Several of the VBSAs from the map of FIG. 2 are listed in the table of FIG. 5, such as Syosset, Bayonne, Bradley Beach, Sherman Avenue and North Airport. The table includes two identification (ID) fields, ID1 and ID2. As shown, the ID1 field contains two copies of the SID, and the ID2 field contains two copies of the NID. The SID and NID data in these fields allows access to the records and the associated location data as outlined above. Two copies of IDs are provided for backwards compatibility. The VBSA is compatible with Qualcomm type 1 and type 2 BSA. For purposes of the example, the data corresponds to the VBS examples shown on the map in FIG. 2.

Logically, the VBSA database 33 divides the coverage areas of a particular carrier (roaming carrier) into defined regions or areas. These areas correspond to groups of the roaming carrier's base stations that may provide service to a roaming mobile station 15. The groups of base stations can be modeled in the aggregate as virtual non-sector base stations (omni cells). Each VBS and its coverage area is defined by the SID and NID combination being sent by all of the base stations of the VBS group. FIG. 2 illustrates several such cells in and around NJ by way of example.

In the line in the table for the Bayone VBS, the data in the ID1 field shows a SID of 22, and the data in the ID2 field shows a NID of 15. In the line in the table for the Syosset VBS, the data in the ID1 field shows a SID of 22, and the data in the ID2 field shows a NID of 12. The ID1 field in the line for Rockaway lists a SID of 22, and the ID2 field for Rockaway lists a NID of 18. In the line in the table for the Bradley Beach VBS, the data in the ID1 field shows a SID of 22, and the data in the ID2 field shows a NID of 14. In the line in the table for the Sherman Ave VBS, the data in the ID1 field shows a SID of 8, and the data in the ID2 field shows a NID of 4. In the line in the table for the North Airport VBS, the data in the ID1 field shows a SID of 8, and the data in the ID2 field shows a NID of 2. The ID1 field in the line for Ocean County lists a SID of 250, and the ID2 field for Ocean County lists a NID of 1. The data contents of the table in FIG. 5 and as shown in FIG. 2 are not real data, but are examples selected to demonstrate the theory of the VBSA under discussion here.

Another column in the table lists Maximum Antenna Range (MAR) for each VBS corresponding approximately to the radius of a circular omni cell roughly corresponding to the combined cell coverages of the real base stations. In this example, the MAR is estimated at 75000 meters for each VBS cell coverage area. The table includes antenna latitude and longitude as well as cell center latitude and longitude. For each of the virtual cells, the two sets of latitude and longitude data are the same, and either set can be used for a preliminary latitude and longitude fix on a mobile station 15 that sends the SID/NID data for a particular VBS to the PDE 29.

Figure 6:
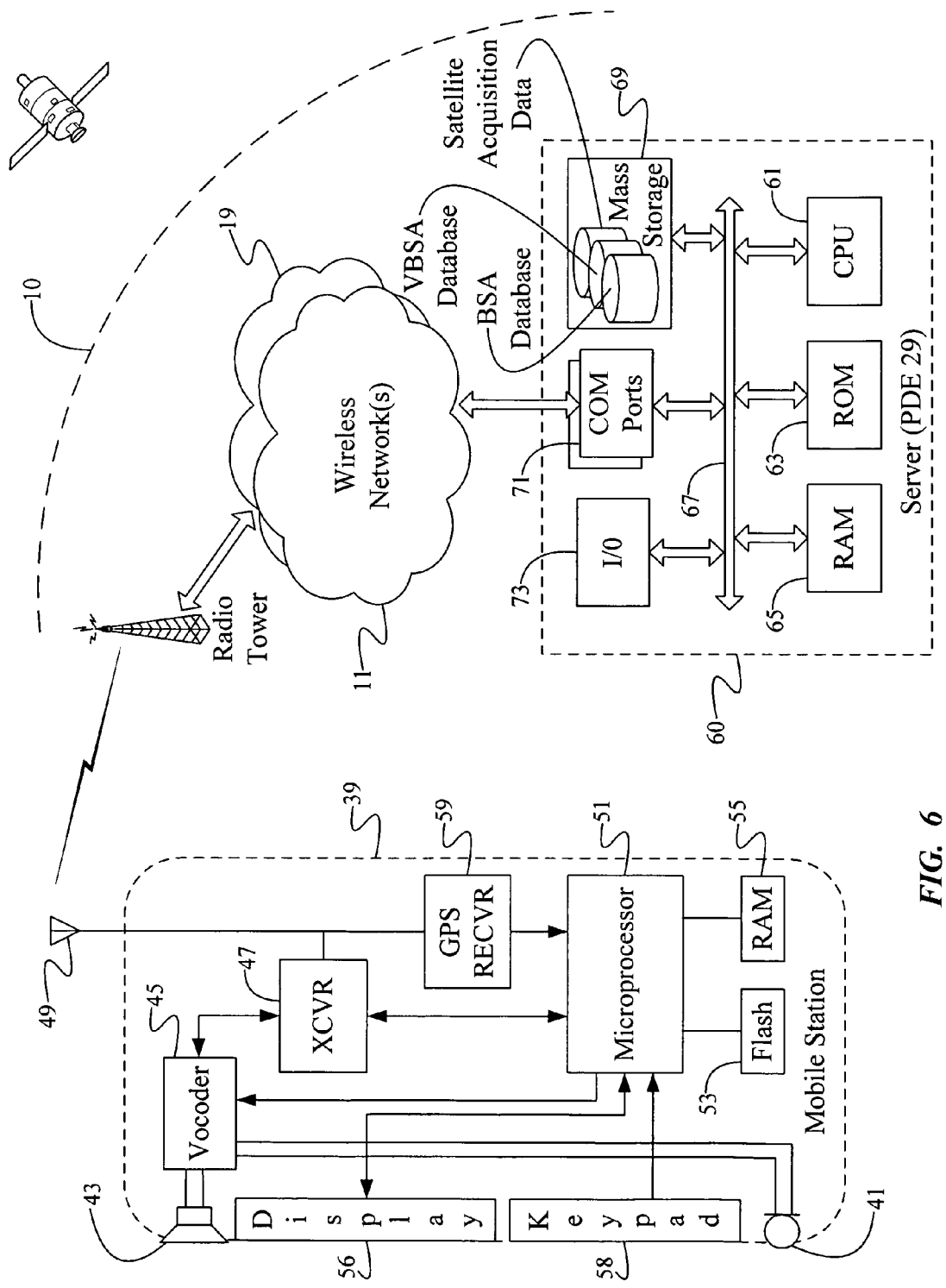
FIG. 6 provides block diagram illustrations of a GPS enabled mobile station and a server functioning as the PDE.

It is assumed that those skilled in the art are familiar with the structure and operation of the mobile stations, such as the handsets 13 and 15. The discussion herein focuses on mobile station position determinations, as assisted through network communications. To insure a full understanding by all readers, it may be helpful to consider a high level summary review of the relevant structure of one example of a mobile station. FIG. 6 provides block diagram illustrations of a GPS enabled mobile station 39 that may operate as the station 13 or as the station 15 and a server 60 that may function as the PDE 29.

Although the station 39 may be incorporated into a vehicle mounted mobile unit or into another device, such as a portable personal computer or PDA, for discussion purposes the illustration shows the station 39 in the form of a handset. The handset embodiment of the mobile station 39 functions as a normal digital wireless telephone station. For that function, the station 39 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 39 also includes a digital transceiver (XCVR) 47. The concepts discussed here encompass embodiments of the station 39 utilizing any digital transceivers that conform to current or future developed digital wireless communication standards. For example, the transceiver 47 could be an EVDO, TDMA or GSM unit designed for cellular or PCS operation. In the present embodiments, the digital transceiver 47 is a CDMA transceiver compatible with operation via an IS-95 network or a 1× network, to provide both voice and/or data communications. Multimode transceivers also may be used.

The transceiver 47 provides two-way wireless communication of information, such as vocoded speech samples and/or digital message information. The transceiver 47 also sends and receives a variety of signaling messages in support of the various services provided via the station 39 and the network 10. Communications via the transceiver 47 and the antenna 49 may include various messages related to acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 39 may include one or more additional transceivers, for example, for operation in an analog mode or in accord with an alternative digital standard.

A microprocessor 51 controls all operations of the mobile station 39. The microprocessor 51 is a programmable device. The mobile unit 39 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software. As discussed more later, the stored software will also include at least one application relating to GPS based position determination and may include one or more location based service applications that utilize determined position information. The memories also store data, such as telephone numbers and server addresses and data input by the user.

As shown, the digital telephone handset 39 includes a display 56 for displaying messages, menus or the like, call related information dialed by the user, calling party numbers, etc. For position location type services, the display 56 provides output of text and/or image information regarding the determined location and/or surrounding areas, e.g. LAT/LON data, map displays and possibly displays of information about items of interest in and around the determined location. A keypad 58 enables dialing digits for voice and/or data calls and generating selection inputs keyed by the user based on the displayed menu. The display 56 and keypad 58 are the physical elements providing a textual or graphical user interface. In addition to normal telephone related input/output, these elements are also used for display of menus and other information to the user and user input of selections, for the applications relating to determining position and providing ancillary position specific information for a location based service. Of course other user interface elements may be used, such as a stylus and touch sensitive display screen, as in a PDA.

For position determination and associated location based services, the mobile station 39 also includes a GPS receiver 59. Under control of the microprocessor 51, the GPS receiver 59 receives and processes signals from one or more satellites of the constellation 21 of GPS satellites. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 39 could process the pseudorange measurements, absolute times of transmission of the GPS signals, and the satellite position data to compute the station's latitude and longitude. However, because of size/space/cost constraints on the design of the mobile stations, the GPS receiver in the mobile station often will have only reception capability, not the full GPS processing capability to resolve position from signals received from the satellites 21. Hence, the receiver 59 supplies the GPS measurement and code data to the microprocessor 51, which in turn formats the data and sends it to the PDE 29 using the wireless transceiver 47. The PDE 29 performs the data processing necessary to determine the latitude and longitude of the station 39 and transmits that data where needed, which in some cases will be back to the mobile station 39 for further processing.

The structure and operation of the mobile station 39, as outlined above, were described to by way of example, only.

FIG. 6 also shows a general-purpose computer system 60, which may operate as a server or the like to implement the PDE 29 in the system 10 of FIG. 1. The exemplary computer system 60 contains a central processing unit (CPU) 61, read only memory (ROM) 63, one or more random access memories (RAM) 65 and an interconnect bus 67. The main memories represented by the ROM and RAM may include a variety of other storage elements, such as high-speed cache memory. The CPU 61 may contain a single microprocessor, or may contain a plurality of microprocessors for configuring the computer system of server 60 as a multiprocessor system. The main memory typically includes dynamic random access memory (DRAM), and in operation, the main memory stores at least portions of data and of instructions for execution by the CPU 61.

The computer system of server 60 also includes one or more mass storage devices 69, such as hard disk drive(s), various other optical and/or magnetic disk drives, tape drives, etc. Program instructions are loaded to main memory and are supplied from main memory to the CPU 61 for execution. The mass storage drive 69 stores the data and programming related to the mobile station location services available from the PDE 29. Although the server 60 may access separate resources that store the BSA and VBSA databases, in the example, one or more mass storage devices 69 within the PDE also maintain at least a working copy of each of those databases. The computer system of server 60 will also process satellite acquisition data for the assistance records developed/sent based on the pre-fix locations obtained from the BSA and VBSA database processing. The satellite acquisition data may be stored on one or more of the internal mass storage devices 69 as shown, on an external storage device or on equipment accessible by network communications. Although not separately shown, the mass storage may also include one or more drives for various portable media, such as a floppy disk, a compact disk read only memory (CD-ROM), digital video disk (DVD) type ROM, or an integrated circuit non-volatile memory adapter (i.e. PCMCIA adapter) to input and output executable code and/or data to and from the computer system 60.

The computer system of server 60 also includes one or more input/output interfaces for communications, shown by way of example as interfaces 71 for data communications. The interfaces 71 may include an Ethernet card or any other appropriate data communications devices. To perform as the server 60 for operation as the PDE 29, at least one of the interfaces 71 preferably provides a relatively high-speed link to the MSC 23 for communications through the networks 11 and 19 forming the wireless network 10, as discussed above relative to FIG. 1.

The computer system of server 60 may further include appropriate input/output ports 73 for interconnection with user interface elements (not shown), such as a local display and a keyboard or the like, serving as a local user interface for programming or maintenance purposes. Alternatively, the server operations personnel may interact with the system 60 for control and programming of the system from a user device, which may be locally connected thereto or connected to the server 60 via the Internet or some other network link.

As noted earlier, the satellites transmit the ephemeris data, and a ground control station periodically updates the ephemeris data to maintain accuracy. Each GPS satellite broadcasts the almanac data for all the GPS satellites in the GPS constellation. To facilitate its acquisition assistance processing, the PDE 29 may include a GPS antenna and receiver (not separately shown) or a pre-processed data feed, for receiving GPS signals from one or more of the satellites 21 of the orbiting constellation. The CPU 61 of the PDE processes received GPS signals to obtain up to date satellite reference information (e.g. timing, almanac and/or ephemeris data). The PDE 29 may also be responsive to a separate time reference receiver, which determines timing, typically from the GPS satellite signals. This additional received data, for example, may be stored as the satellite acquisition data in the mass storage device(s) 69, for later processing into assistance records for delivery as acquisition assistance data to the mobile stations 13, 15.

Operations described above may be carried out by execution of software, firmware, or microcode operating computers or other programmable processor devices of any type. The programming of the mobile station devices will typically implement a standard GPS application, appropriate to the particular type of device 13 or 15, as well as other software such as client browser and text messaging applications one or more of which may invoke location based services via the network 10.

The computer system 60 operating as the PDE 29 runs a variety of server applications programs and stores relevant data, for its intended location related service operations and associated acquisition assistance functions. Of note for purposes of this discussion, the programming includes a general server application, as well as software specifically related to the PDE application and acquisition assistance services as outlined above. Those skilled in the art will recognize that the computer system 60 may run other programs and/or host a wide range of other applications. Also, the functions of the server 60 may be implemented as a single computer system or as a distributed system having multiple appearances, some of which may be at different nodes on a network. Executable program code for implementing the acquisition assistance and other PDE operations may be in the form of computer instruction(s) in any form, e.g. source code, object code, interpreted code, etc., stored in or carried by any computer or machine-readable medium.

The software functionalities, e.g. to implement the acquisition assistance processing and signaling communications shown in FIGS. 3 and 4 and possible associated GPS data processing to determine the final location fix, involve programming, including executable code as well as associated stored data. The software code is executable by the general-purpose computer 60 or other system component(s) that functions as the PDE 29. In operation, the executable program code is stored in mass storage 69 and uploaded to main memory. The associated data for the BSA and/or VBSA databases and the necessary satellite data may be stored in mass storage or the like within the general-purpose computer platform 60, or the computer 60 may access any or all of that data by communication with storage at or on another platform. At times, the software (code and/or data) may be stored at other locations and/or transported for loading into the appropriate general-purpose computer system. Hence, software products embodiments of various techniques discussed above involve at least one machine-readable medium bearing data and/or bearing one or more modules of code. Execution of code from such a product by a processor of the computer or other platform, for example enables the platform to perform the PDE functions in essentially the manner performed in the embodiments discussed and illustrated herein. Another such product might provide a VBSA database for use by a PDE.

As used herein, terms such as computer or machine "readable medium" refer to any medium that participates in providing instructions to a processor for execution or data to a processor for data processing operations. Such a medium may take many forms, including but not limited to, non-volatile media, volatile media, and transmission media. Nonvolatile media include, for example, optical or magnetic disks, such as any of the storage devices in any computer(s) 60 operating as the PDE 29, other elements of the network 10 or the mobile station 39. Volatile media include dynamic memory, such as main memory of such a computer platform or mobile station. Physical transmission media include coaxial cables; copper wire and fiber optics, including the wires that comprise a bus 67 within a computer system 60. Carrier-wave transmission media can take the form of electric or electromagnetic signals, or acoustic or light waves such as those generated during radio frequency (RF) and infrared data communications. Many of these forms of computer readable media may be involved in carrying one or more sequences of one or more instructions to a processor for storage and/or for execution. Similarly, such forms of computer readable media may be involved in carrying the VBSA database or data for loading into such a database, to the PDE or other processing element for future use.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Acquisition Assistance (AA)
Advanced Forward Link Trilateration (AFLT)
Base Station (BS)
Base Station Almanac (BSA)
Base Transceiver System (BTS)
Central Processing Unit (CPU)
Code Division Multiple Access (CDMA)
Compact Disk Read Only Memory (CD-ROM)
Digital Video Disk (DVD)
Dynamic Random Access Memory (DRAM)
Evolution-Data Only (EVDO)
Global Positioning System (GPS)
Global System for Mobile (GSM)
Identification (ID)
Latitude (LAT)
Longitude (LON)
Location-Based Service (LBS)
Maximum Antenna Range (MAR)
Mobile Identification Number (MIN)
Mobile Position Center (MPC)
Mobile Station (MS)
Mobile Switching Center (MSC)
Network Identification (NID)
Personal Computer (PC)
Personal Computer Memory Card International Association (PCMCIA)
Personal Communication Service (PCS)
Portable Digital Assistant (PDA)
Position Determination Entity (PDE)
Pseudo-random Noise (PN)
Radio Frequency (RF)
Random Access Memory (RAM)
Read Only Memory (ROM)
System Identification (SID)
Time Division Multiple Access (TDMA)
Virtual Base Station (VBS)
Virtual Base Station Almanac (VBSA)

What is claimed is:

1. A method of determining position of at least one mobile station operating in a wireless communication network, comprising:

receiving messages from the at least one mobile station, each message including at least one item of information identifying a portion of a mobile wireless communication network through which the at least one mobile station is receiving wireless communication service;

based on identifying information in a first received message, accessing a record in a base station almanac (BSA) database for a base station through which a mobile station is receiving wireless communication service from among a plurality of records in the BSA database, each of the records in the BSA database providing position related information regarding a respective base station;

using the position related information from the accessed BSA database record to obtain a mobile station position fix, responsive to the first message;

based on identifying information in a second received message, accessing a record in a virtual base station almanac (VBSA) database for a region in which the mobile station is receiving wireless communication service from among a plurality of records in the database, each of the records in the VBSA database providing estimated location information for a region corresponding to combined service areas of defined group of base stations that utilize the same respective identifying information, wherein base stations of the defined group do not have position information indicated in records in the BSA; and using the estimated location information for the region in which the mobile station is receiving wireless communication service, from the accessed VBSA database record, as an estimate of position of a mobile station, responsive to the second message.

2. The method of claim 1, wherein the use of the estimated location information comprises:

processing satellite position data for a constellation of satellites to obtain acquisition assistance data for a subset of the satellites of the constellation from which transmissions are expected to be receivable in the region in which the mobile station is receiving wireless communication service; and transmitting the obtained acquisition assistance data to the mobile station for use in acquisition of a position measurement from one or more satellites of the subset.

3. The method of claim 2, wherein the obtained acquisition assistance data comprises a selected subset of almanac or ephemeris data for satellites of the global positioning system (GPS) from which transmissions are expected to be receivable within the region in which the mobile station is receiving wireless communication service.

4. The method of claim 1, wherein the at least one item of information included in the second received message comprises a System Identification (SID) and a Network Identification (NID) used by a defined group of base stations providing wireless communications service in the region in which the mobile station is receiving wireless communication service.

5. The method of claim 4, wherein:

the records of the VBSA database identify each respective virtual base station by a unique combination of SID and NID used by base stations of a network operator providing wireless communications service in a region corresponding to the respective virtual base station; and each of the records of the VBSA database contains information as to position of a point in the region corresponding to the respective virtual base station.

6. The method of claim 5, wherein:

the estimated location information comprises information as to position of the center of the region corresponding to the respective virtual base station identified by the received SID and NID; and the use of the estimated location information comprises:

(a) processing satellite position data for a constellation of satellites to obtain acquisition assistance data for a subset of the satellites of the constellation from which transmissions are expected to be receivable in a region corresponding to the respective virtual base station identified by the received SID and NID; and (b) transmitting the obtained acquisition assistance data to the mobile station for use in acquisition of a position measurement from one or more satellites of the subset.

7. A position determining entity programmed to implement the method of claim 1.

8. A product comprising: programming for causing a server to implement the method of claim 1, and a machine readable storage medium bearing the programming.

9. A system for estimating of position of at least one mobile station operating in a wireless communication network, comprising:
   (1) a base station almanac (BSA) database comprising a record for each of a plurality of actual base stations of the wireless communication network each record for a respective actual base station including position information for the respective actual base station;
   (2) a virtual base station almanac (VBSA) database comprising a record for each of a plurality of virtual base stations (VBSs), wherein:
      (a) each VBS record contains location data regarding position of a point within a coverage region of a respective one of the VBSs;
      (b) each VBS record is accessible using at least one item of identifying information used in common by base stations of a defined group providing wireless communications service in the coverage region of the respective one of the VBSs; and
      (c) base stations of the defined group do not have position information indicated in records in the BSA; and
   (3) a Position Determination Entity (PDE) having access to the BSA and VBSA databases and configured for data communication with the at least one mobile station through a portion of the wireless communication network, wherein the PDE is configured to:
      (i) receive messages from the at least one mobile station, each message including at least one item of information identifying a portion of the wireless communication network through which the at least one mobile station is receiving wireless communication service;
      (ii) in response to a first message in which the identifying information identifies a base station having a record in the BSA database, access the record for the identified base station in the BSA database based on the received identifying information, to obtain location data associated with the identified base station;
      (iii) use the obtained location data associated with the identified base station for a mobile station position determination responsive to the first message;
      (iv) in response to a second message in which the identifying information does not correspond to a base station having a record in the BSA database, access a VBS record in the VBSA database based on the identifying information in the second message, to obtain location data regarding position of a point within a coverage region corresponding to the VBS identified by the identifying information in the second message; and
      (iv) use the obtained location data regarding the point within the coverage region corresponding to the identified VBS as an estimate of the position of a mobile station responsive to the second message.

10. The system of claim 9, wherein:
   the point within in the coverage region of the respective one of the VBSs is an approximate center of the coverage region of the respective one of the VBSs; and
   location data regarding position contained in each VBS record comprises latitude (LAT) and longitude (LON) of the approximate center of the coverage region of the respective one of the VBSs.

11. The system of claim 10, wherein each VBS record further contains a system identification (SID) and a network identification (NID) used in common by the base stations of the group providing wireless communications service in the coverage region of the respective one of the VBSs, for use as the at least one item of identifying information.

12. The system of claim 9, wherein the PDE is configured to use of the estimate of the position of the mobile station to:
   process satellite position data for a constellation of satellites to obtain acquisition assistance data for a subset of the satellites of the constellation from which transmissions are expected to be receivable in the VBS coverage region in which the mobile station is receiving wireless communication service; and
   transmit the obtained acquisition assistance data to the mobile station for use in acquisition of a position measurement from one or more satellites of the subset responsive to the second message.

13. The method of claim 1, wherein:
   the records in the BSA database provide the position related information with respect to base stations operated by a network service provider, and the identifying information in the first received message identifies a base station for which there is a record in the BSA database when the mobile station is receiving wireless communication service from one of the service provider's base stations; and
   the records in the VBSA database provide the estimated location information for regions associated with defined groups of base stations not operated by the service provider, and the identifying information in the second received message indicates that the mobile station is not receiving wireless communication service from one of the service provider's base stations.

14. System of claim 9, wherein:
   the records in the BSA database provide the position related information with respect to base stations operated by a network service provider; and
   the records in the VBSA database provide the estimated location information for regions associated with defined groups of base stations not operated by the service provider.

* * * * *